US011086706B2

(12) United States Patent
Kancharla et al.

(10) Patent No.: US 11,086,706 B2
(45) Date of Patent: *Aug. 10, 2021

(54) SYSTEM AND METHOD OF INPUT VALIDATION

(71) Applicant: Capital One Services, LLC, McLean, VA (US)

(72) Inventors: Gopi K. Kancharla, Frisco, TX (US); Poornachander Juvvadi, Plano, TX (US); Kelly Birch, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,500

(22) Filed: Sep. 19, 2019

(65) Prior Publication Data

US 2020/0125438 A1 Apr. 23, 2020

Related U.S. Application Data

(63) Continuation of application No. 16/167,113, filed on Oct. 22, 2018, now Pat. No. 10,467,076.

(51) Int. Cl.
| | | |
|---|---|---|
| *G06F 11/00* | (2006.01) | |
| *G06F 11/07* | (2006.01) | |
| *G06F 9/54* | (2006.01) | |
| *G06F 11/30* | (2006.01) | |
| *G06F 16/907* | (2019.01) | |
| *G06F 11/36* | (2006.01) | |

(52) U.S. Cl.
CPC .......... *G06F 11/0763* (2013.01); *G06F 9/542* (2013.01); *G06F 11/0745* (2013.01); *G06F 11/3072* (2013.01); *G06F 11/3604* (2013.01); *G06F 11/3664* (2013.01); *G06F 16/907* (2019.01)

(58) Field of Classification Search
CPC ............. G06F 11/3604; G06F 11/3664; G06F 11/3072; G06F 11/0763
See application file for complete search history.

(56) References Cited

U.S. PATENT DOCUMENTS

| | | | |
|---|---|---|---|
| 7,454,667 B2 | 11/2008 | Joglekar et al. | |
| 9,552,237 B2 | 1/2017 | Biesack | |
| 10,129,232 B1* | 11/2018 | Phuong | G06F 11/362 |
| 2008/0034424 A1 | 2/2008 | Overcash et al. | |
| 2011/0016202 A1 | 1/2011 | Ye et al. | |

(Continued)

*Primary Examiner* — Charles Ehne
(74) *Attorney, Agent, or Firm* — DLA Piper LLP (US)

(57) ABSTRACT

A computer-implemented method of validating an input object with a validation framework is described. A configuration module may load a validation configuration file from an external storage system. A domain module may receive the input object from an external input source. An executor module may collect property metadata of the input object and construct a searchable key based on the property metadata. The executor may retrieve a validator name associated with the searchable key from the validation configuration file and retrieve a validator associated with the validator name, wherein the validator initiates a validation process on the input object. The executor may receive a validation result from the validator and output the validation result and the error list.

19 Claims, 4 Drawing Sheets

(56) References Cited

U.S. PATENT DOCUMENTS

| | | | |
|---|---|---|---|
| 2011/0185282 A1* | 7/2011 | Mahmood | G06F 21/64 715/744 |
| 2014/0143605 A1 | 5/2014 | Balla et al. | |
| 2018/0285237 A1 | 10/2018 | Scott et al. | |
| 2019/0045360 A1 | 2/2019 | Greer | |

* cited by examiner

SYSTEM AND METHOD OF INPUT VALIDATION

CROSS-REFERENCE TO RELATED APPLICATION INFORMATION

This is a continuation of U.S. patent application Ser. No. 16/167,113, filed Oct. 22, 2018, which is incorporated herein by reference in its entirety.

FIELD

The present disclosure generally relates to input validation in software systems.

BACKGROUND

The software and technology world is moving to cloud-based, cluster-oriented micro-services solutions. Many software services collect input from users' activity on the web or from system generated messages. Single input objects (or "payloads") to these services can consist of hundreds of thousands of data elements to process. With this magnitude of data, it becomes critical to have appropriate validations to ensure the user-supplied or system-supplied data elements are correct, also known as input validation, before the system processes the data. These validation services are responsible for responding to user or system inputs with accurate information, including details on why the provided list of input payloads was invalid. When the service cannot process the given payload, this feedback enables the input user to correct the errors, before attempting to send the request again.

SUMMARY

In an aspect of the present disclosure, a method of validating an input using a computer-based validation framework includes receiving, by the validation framework, an input; generating, by the validation framework, one or more properties from the input; constructing, by the validation framework, a key using at least one of the one or more properties; choosing, via using the key by the validation framework, a validation type from a configuration file that has been pre-loaded into volatile memory from a source external to the validation framework; executing a validator, based on the validation type, on the input to find one or more errors for the at least one property; and returning a list of errors including the one or more errors.

In some embodiments of the method, the list of errors includes each of the errors found for each of the properties from the input. Therefore, instead of returning only the first encountered error, the method may return a more complete list of errors that the input file contains. In some embodiments, the method includes filtering the list of errors, before returning it, according to a user-defined filter. The validation type may include a validator name, an error code, or an error message. The executed validator may include the validator name. The input may include multiple properties. The configuration file may be a YML file.

In an aspect of the present disclosure, a computer-readable medium has instructions stored thereon which when executed by a machine cause the machine to load a validation configuration file from an external storage system by a configuration loader module of a validation framework; receive a first input object from a first external input source, wherein the first input object includes a first set of property metadata; construct a first searchable key based on the first set of property metadata; retrieve a first validator name associated with the first searchable key from the validation configuration file; retrieve a first validator associated with the first validator name, wherein the first validator initiates a first validation process on the first input object; in response to a first validation result including no error code, receive a second input object from a second external input source, wherein the second input object includes a second set of property metadata; construct a second searchable key based on the second set of property metadata; retrieve a second validator name associated with the second searchable key from the validation configuration file; retrieve a second validator associated with the second validator name, wherein the second validator initiates a second validation process on the second input object; and output the first validation result from the first validation process and a second validation result from the second validation process.

In some embodiments of the computer-readable medium, the validation configuration file includes a YML file. The validation configuration file may include a validator name, an error code, or an error message. The property metadata may include type, name, parent type, or property value. Either or both of the first external input source and the second external input source may include a user input. Either or both of the first external input source and the second external input source may include an API. The error list may include an error code and an error message associated with the error code.

In an aspect of the present disclosure, a system of validating an input object includes a memory configured to store program instructions; an external storage system configured to store a validation configuration file; and a processor communicatively coupled to the memory and to the external storage system. The processor, in this aspect, is configured to execute program instructions that cause the processor to load the validation configuration file from the external storage system by a configuration loader module of a validation framework; receive the input object from an external input source by a domain module of the validation framework; collect property metadata of the input object by an executor module of the validation framework; construct a searchable key based on the property metadata; retrieve a validation map associated with the searchable key from the validation configuration file; retrieve a validator associated with the validation map, wherein the validator initiates a validation process on the input object; and output an error list.

In some embodiments of the system, the validation configuration file includes a YML file. The property metadata may include a type, a name, a parent type, or a property value. The external input source may include a user input. The external input source may include an API. The error list may include an error code and an error message associated with the error code.

The embodiments of the present disclosure have various advantages. For example, the validation framework can be configurable, in that the validations, including the error codes and descriptions, can be externalized to a configuration file that is easy to edit and that can avoid text duplications in the source code. The validation framework can also be reusable, in that the same validation can be used for multiple inputs. The validation framework can also be dynamic, in that once a user creates a validation, the system can dynamically choose and run the validation from the configuration. The validation framework can also be extendable, in that new custom validations can be built using the existing validations. Moreover, the validation framework can make use of validations that are pre-loaded, for example during application start-up time, and then kept in memory for quick execution. Furthermore, because the methods can output a complete list of errors found in an input, the methods promote saving time and network bandwidth.

BRIEF DESCRIPTION OF THE DRAWINGS

To assist those of skill in the art, reference is made to the accompanying figures. The accompanying figures, which are incorporated in and constitute a part of this specification, illustrate one or more embodiments of the invention and, together with the description, help to explain the invention. Illustrative embodiments are shown by way of example in the accompanying drawings and should not be considered as limiting.

DETAILED DESCRIPTION

Software applications can be deployed to validate user-supplied or system-supplied inputs, while accounting for various custom enterprise standards for application programming interface (API) or system calls. Responding to users or systems explaining what input is invalid among many nested data structures can be challenging. Solutions that validate each input element with custom error codes and descriptions are not desirable, because they are time intensive to create and often need multiple updates as requirements change, which wastes development resources. Also, computing efficiency may be lost when input elements requiring multiple validations fail.

In order to solve the above issues, the present disclosure describes systems and methods of input validation which are configurable, reusable, dynamic, and extendable. The systems and methods of input validation may further deploy validations that are pre-loaded into memory (e.g., before runtime) for quick execution. In addition, the framework disclosed herein is highly scalable to validate different and diverse objects.

In some embodiments, the data configurations and validations, including the error codes and corresponding error descriptions, may be externalized from the source code. The system may read from a configuration file to simplify the externalization and to avoid text duplication. In some embodiments, the configuration file may be a YML file written in a language such as YAML. Due to features like these, the framework and methods described herein can be configurable.

In some embodiments, the same validation (also referred to as "validation type") with corresponding error code and error description may be used for multiple data inputs. The existing validation may also be extended to build a brand new custom validation and it may be injected automatically. Due to such features, the framework and methods described herein can be reusable.

In some embodiments, users may create the validations and the auto injection mechanism inserts them to the framework. In some embodiments, the injection mechanism may be configured to load validation components derived from the configuration file. The system may choose the validation dynamically during runtime and run the validator based on what is passed from the injection mechanism. Due to such features, the framework and methods described herein can be dynamic.

In some embodiments, existing validations may be extended to build new custom validations, such as performing several validations on a single input, without duplicating checks. As such, the framework and methods described herein can be extendible.

In some embodiments, validations may be loaded during the system start-up time and kept ready in-memory, allowing quick execution and not requiring reloading. With this approach the validations may be run quickly on input payloads, because at runtime there is no waiting on load time for multiple properties from multiple type elements.

Figure 1:
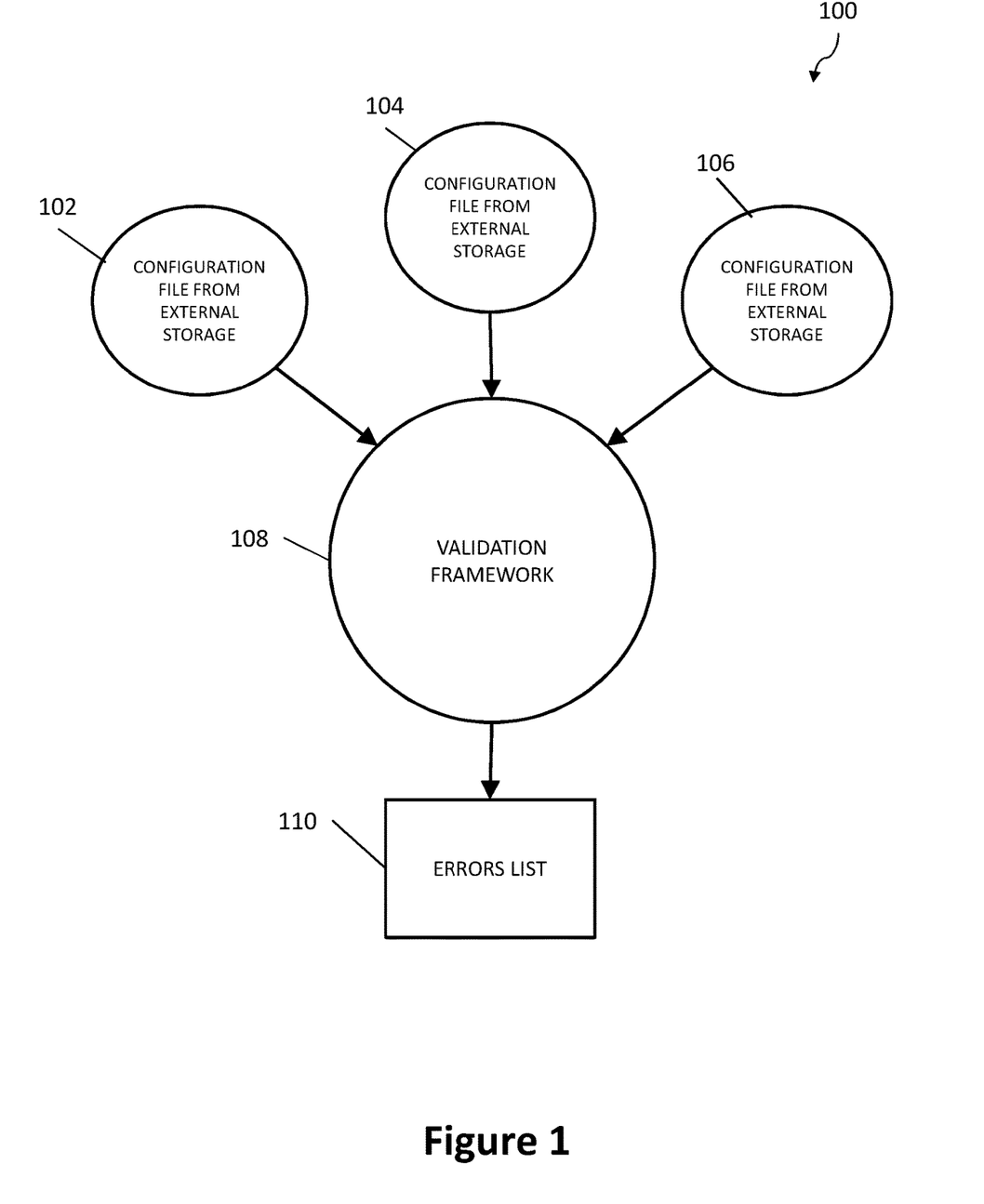
FIG. 1 is a flow diagram showing an overview of a validation process, according to some embodiments of the present disclosure.

FIG. 1 is a flow diagram showing an overview of validation process 100, according to some embodiments of the present disclosure. Configuration files 102, 104, and 106 may be stored in one or more external storage devices. Configuration files 102, 104, and 106 may be different configuration files. In some embodiments, a configuration file may include configuration information related to validation processes, such as different properties of an input object that need to be validated and the corresponding validator names, error codes, error messages, etc. The validator name may define a specific validator that should be used to verify the corresponding property and it may be used to retrieve a validator. The error code and error message may provide feedback to the input user and enable the user to correct the error. In some embodiments, a configuration file may be loaded into a memory before the validation processes start and the configuration information can be retrieved.

In some embodiments, configuration files 102, 104, and 106 may be YML files written in the language of YAML. In some embodiments, different configuration files may be associated with different validations. Alternatively, the same configuration file may be used for multiple validations. For example, the same configuration file may be used in checking if an input object includes a name as well as if the date of birth data is valid. The same configuration file may also be used for validations of multiple input objects.

An example of a text-based external YML (human friendly data serialization standard) configuration file is provided below.

```
errorCodes:
  codeDescription:
    application:
      NULL_EMPTY_CHECK: 101 | Prequalification Application details cannot be Empty
    "[application.applicationType]":
      NULL_EMPTY_CHECK: 102 | Applicant Type is either Empty or Invalid
```

```
    REGEXPR_CHECK: '(?i)^(JOINT|INDIVIDUAL)$ --- 102 --- Applicant Type is Invalid'
"[application.applicant]":
    NULL_EMPTY_CHECK: 103 | Applicant Section cannot be Empty
"[application.applicant.taxId]":
    NULL_EMPTY_CHECK: 104 | Applicant taxId cannot be Empty
    LENGTH_CHECK: 9 | 104 | Applicant taxId should be exactly 9 digits
"[application.applicant.fullName]":
    NULL_EMPTY_CHECK: 105 | Applicant Name cannot be Empty
"[application.applicant.fullName.firstName]":
    NULL_EMPTY_CHECK: 106 | Applicant first name is Empty or Invalid
"[application.applicant.fullName.lastName]":
    NULL_EMPTY_CHECK: 107 | Applicant last name is Empty or Invalid
"[application.applicant.dateOfBirth]":
    NULL_EMPTY_CHECK: 108 | Applicant dateOfBirth is either Empty or Invalid
    REGEXPR_CHECK: '^\d{4}[-]?\d{2}[-]?\d{2}$ --- 108 --- Applicant dateOfBirth is either Empty or Invalid'
"[application.applicant.phoneNumbers]":
    NULL_EMPTY_CHECK: 109 | Applicant 'phoneNumbers' section cannot be Empty
"[application.applicant.addresses.currentAddress.address.city]":
    NULL_EMPTY_CHECK: 122 | Applicant currentAddress 'city' is either Empty or Invalid
"[application.coApplicant.taxId]":
    NULL_EMPTY_CHECK: 204 | CoApplicant taxId cannot be Empty
    LENGTH_CHECK: 9| 204 | CoApplicant taxId should be exactly 9 digits
"[application.coApplicant.fullName]":
    NULL_EMPTY_CHECK: 205 | CoApplicant Name cannot be Empty
"[application.coApplicant.fullName.firstName]":
    NULL_EMPTY_CHECK: 206 | CoApplicant first name is Empty or Invalid
"[application.coApplicant.fullName.lastName]":
    NULL_EMPTY_CHECK: 207 | CoApplicant last name is Empty or Invalid
"[application.coApplicant.dateOfBirth]":
    NULL_EMPTY_CHECK: 208 | CoApplicant dateOfBirth is either Empty or Invalid
    REGEXPR_CHECK: '^\d{4}[-]?\d{2}[-]?\d{2}$ --- 208 --- CoApplicant dateOfBirth is either Empty or Invalid'
"[application.coApplicant.phoneNumbers.primary.phoneNumberType]":
    NULL_EMPTY_CHECK: 212 | CoApplicant 'telephone number type' cannot be Empty
"[application.coApplicant.employments]":
    NULL_EMPTY_CHECK: 225 | CoApplicant 'Employment' section cannot be Empty
"[application.coApplicant.employments.currentStatus]":
    NULL_EMPTY_CHECK: 226 | CoApplicant 'Employment current status' cannot be Empty
selectedLenders:
    NULL_EMPTY_CHECK: 300 | SelectedLenders section cannot be Empty
"[selectedLenders.lenders]":
    NULL_EMPTY_CHECK: 301 | Lenders section cannot be Empty
    EMPTY_LIST_CHECK: 302 | Application should have atleast one lender
when:
"[application.applicationType]":
    REGEXPR_CHECK: '(?i)^(INDIVIDUAL)$ --- IGNORE_ACTION --- application.coApplicant --- 203'
```

Usually enterprises have their own standards for displaying error codes and error descriptions provided when a user submits an invalid input. This level of enterprise customization typically requires a manual data validation implementation. The validation framework disclosed herein may be used to solve this issue. In some embodiments, validation framework 108 may be configured as a central validation house, connecting with multiple systems through APIs. To perform a specific validation process, validation framework 108 may be configured to retrieve a specific configuration file associated with that validation process from the one or more external storage devices. In some embodiments, the validation framework 108 may be configured to pre-load the configuration file into a memory before the actual run-time so that there is no waiting time during the validation process. After the validation process, the validation framework may be configured to output an error list 110. In some embodiments, error list 110 may include error codes and error messages.

Figure 2:
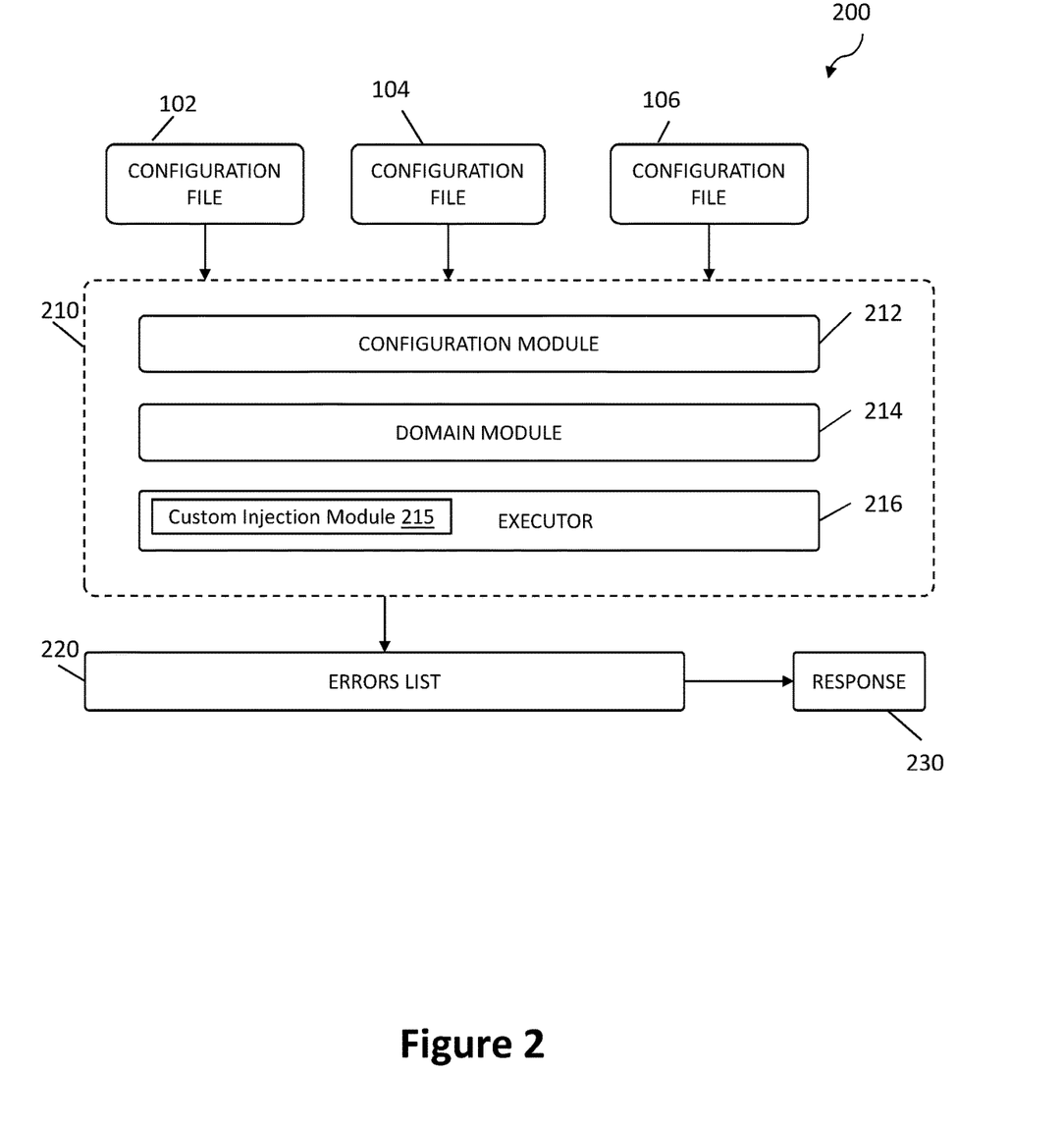
FIG. 2 is a system diagram showing a validation system, according to some embodiments of the present disclosure.

FIG. 2 is a system diagram showing a validation system 200, according to some embodiments of the present disclosure. Configuration files 102, 104, and 106 may be stored in one or more external storage devices and may be associated with different validations. To perform a specific validation process, validation framework 210 may load a specific configuration file associated with that validation process.

In some embodiments, validation framework 210 may include configuration module 212, domain module 214, and executor 216.

In some embodiments, configuration module 212 may be configured to load an external validation configuration file (e.g., a YML file) from an external storage device. In some embodiments, configuration module 212 may be configured to parse the configuration file for further executions.

In some embodiments, domain module 214 may be configured to communicate with other systems through APIs. In some embodiments, domain module 214 may be configured to load an input object which needs to be validated. In some embodiments, regardless of the type of the input object provided, domain module 214 may be configured to read the object and load validations and initiate the validation process.

In some embodiments, executor 216 may be configured to execute validators to validate the properties from a supplied object. Executor 216 may be configured to read some or all properties from a supplied input object, find the validation to run, and then run the validator on the property. In some embodiments, after the basic validations are finished, the executor may be configured to kick off two different processes, "RunWhenConditions" and "CustomUnDefinedConditions," for further filtering of the produced errors. These processes may refine the error list by incorporating user-defined logic, such as ignoring a set of errors if a certain validation failed. In some embodiments, the "RunWhenConditions" process may be configured as a sub-process along with other validators to run a validation based on a condition. In some embodiments, the "CustomUnDefinedConditions" process may be configured to run when the validation framework does not support any validation and the users can write their custom validations and inject them to the framework. The errors (e.g., some, all) may then be wrapped up into a custom JavaScript Object Notation (JSON) object and sent back to clients in one call. This technique saves a significant amount of time and network bandwidth for customers versus a process that sends requests for each validation failure.

In some embodiments, executor 216 may include custom injection module 215, as shown in FIG. 2. Custom injection module 215 may add the ability to inject a custom validator so that executor 216 can take care of custom validations as well. Custom injection module 215 allows deployment of a custom validation injection mechanism as a feature of the validation framework.

After the validation process, framework 210 may be configured to generate error list 220 and transmit response 230 back to the original system which has requested the validation. The feedback may enable the input user to correct the errors before attempting to submit the validation request again.

In some embodiments, executor 216 is configured to (1) kickoff validations; (2) run validations; (3) run when conditions; (4) run custom undefined validations; and (5) execute runners.

The kickoff validations may include the following process: describe properties; collect property information; determine type; find type & validate eligibility; construct searchable key; search in external configuration; retrieve validation; determine validation existence; store the validation to apply (to help with avoiding further validation if needed); check for nested property type availability; retrieve the type (and may loop back to the "describe properties" step if appropriate); and hand over to the "run validations" part of executor 216 with the validation and property description. As part of this process, the system may first read the properties (i.e., elements of a given object supplied) irrespective of the property type, and then may collects each property's metadata. Using this metadata system, the executor may then determine the type of property and intelligently find the corresponding validation to run. The system may construct a searchable key using the property metadata and may retrieve the map of validations to run against using the same key from the external configurations loader. Then the system may verify the existence of each of the validations retrieved from the validations map. If the system cannot find the validation, it may log an error message as a missing injection for that particular validation and may proceed to validate the next validation defined in the map. If this is a custom type requiring further validation of the nested fields, the system may start the process in a recursive manner and proceed forward.

The run validations may include the following three stages: (1) get validation type to run; collect property information; collect property value; and errors; (2) trigger the validation; catch result; and add to errors; and (3) aggregate errors. During these stages, for each property to be processed, executor 216 may collect property metadata such as type, name, parent type, and property value. Using the metadata, executor 216 may construct a key to search for validations in the supplied configurations. When the validator finds the appropriate error message, the validation framework may create a wrapper of an ErrorCodeDescription object, which may be added to the global list of error codes. Then, the validator may proceed to the next property to validate.

Figure 3:
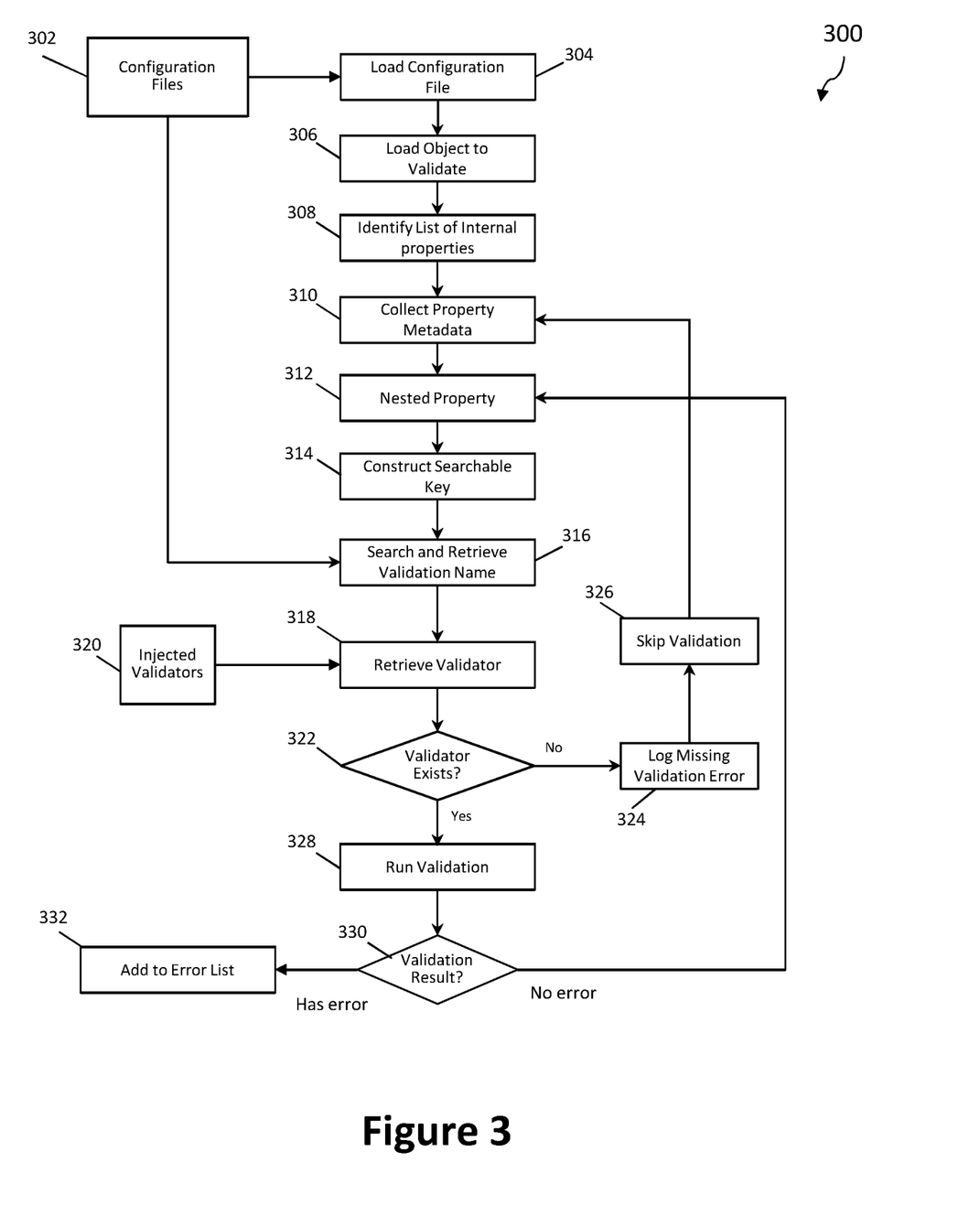
FIG. 3 is a flowchart showing a detailed validation process, according to some embodiments of the present disclosure.

FIG. 3 is a flowchart showing detailed validation process 300, according to some embodiments of the present disclosure. At step 304, configuration module 212 may be configured to load external configuration file 302 into the memory before the run-time. By pre-loading the configuration file during the system start-up time and keeping it in-memory, the system may allow quick execution of validation processes. In some embodiments, there are multiple properties of the input object which need to be validated. By pre-loading the configuration file before the actual validation run-time, there may be no or minimal waiting between different validations.

At step 306, domain module 214 may be configured to load an input object. In some embodiments, the input object may come from a user's input. For example, the user's input may be provided for an online form or a web application. In some embodiments, the input object may come from another software or web application through an API. Validation framework 210 may be configured to connect with multiple software or web applications through APIs, acting as a central validation house. By loading different configuration files, framework 210 may validate different input objects requiring different validation processes. Therefore, it may eliminate the need for multiple custom validation systems for different validations. In some embodiments, the same validation process may also be used for multiple data inputs. For example, a validation process for checking if the last name part is empty may be used for various inputs, ranging from a user's direct input for an online form to database verification.

At step 308, executor 216 may be configured to identify a list of internal properties of the object. Each property may require a specific validation process. For example, an input object of applicant personal information may have properties including first name, last name, date of birth, phone number, mailing address, etc. The first and last names may require an empty check, whereas the date of birth may require a date validity check.

At step 310, executor 216 may be configured to collect property metadata for every given property. In some embodiments, the property metadata may include type, name, parent type, property value, etc. For example, the property of first name may have metadata such as type (character), name ("firstName"), property value ("Joe"), etc.

At step 312, executor 216 may be configured to collect nested properties associated with the property to be validated. For example, the property of first name may correspond to a nested structure of "application→applicant→full name." Therefore, it has a parent structure of "application.applicant.fullName." In some embodiments, the collected nested property may help the executor to identify a validation more accurately.

At step 314, executor 216 may be configured to construct a searchable key based on the property metadata and the nested properties. For example, the property of first name may lead to a searchable key of "application.applicant.fullName.firstName."

At step 316, executor 216 may be configured to search and retrieve a name of a validation process from configuration file 302 using the searchable key. For example, in order to make sure the first name of the applicant is not empty, there may be a validation of empty check. Therefore, the searchable key of "application.applicant.fullName.first-Name" may correspond to a validator name of "NULL_EMPTY_CHECK" in configuration file 302. By searching and locating this validator name, executor 216 may be able to identify a corresponding validator in the following step.

At step 318, executor 216 may retrieve a validator based on the validator name. In some embodiments, different validators 320 for different validations may have been injected to the system before the run-time. Executor 216 may be configured to identify a validator from the injected validators based on the validator name. At step 322, executor 216 may be configured to determine if a proper validator exists in the framework. If not, process 300 may proceed to step 324 in which executor 216 may be configured to log a "missing validator" error message. At step 326, executor 216 may be configured to skip the current validation and return to step 310 to start on the next property which needs to be validated.

An advantage of the method disclosed by the present disclosure is that there may be no waiting time between different validations. Because the configuration file is pre-loaded into the memory and the same configuration file may be used for multiple validations, executor 216 may directly start validating the next property without waiting for a different configuration file to be loaded.

If a proper validator for the validation process exists and is retrieved, executor 216 may be configured to execute the validator at step 328. At the end of the validation process, the validator may be configured to provide a validation result to executor 216. Executor 216 may be configured to analyze the validation result at step 330 and determine if there is any error. If an error occurs, executor 216 may be configured to add it to an error list which may include error codes and error messages at step 332. In some embodiments, executor 216 may be configured to extract a particular error code and/or a particular error message from the configuration file and add it to a global list of errors. If there is no error in the validation, executor 216 may be configured to return to step 312 and start validating other fields within the nested structure.

Figure 4:
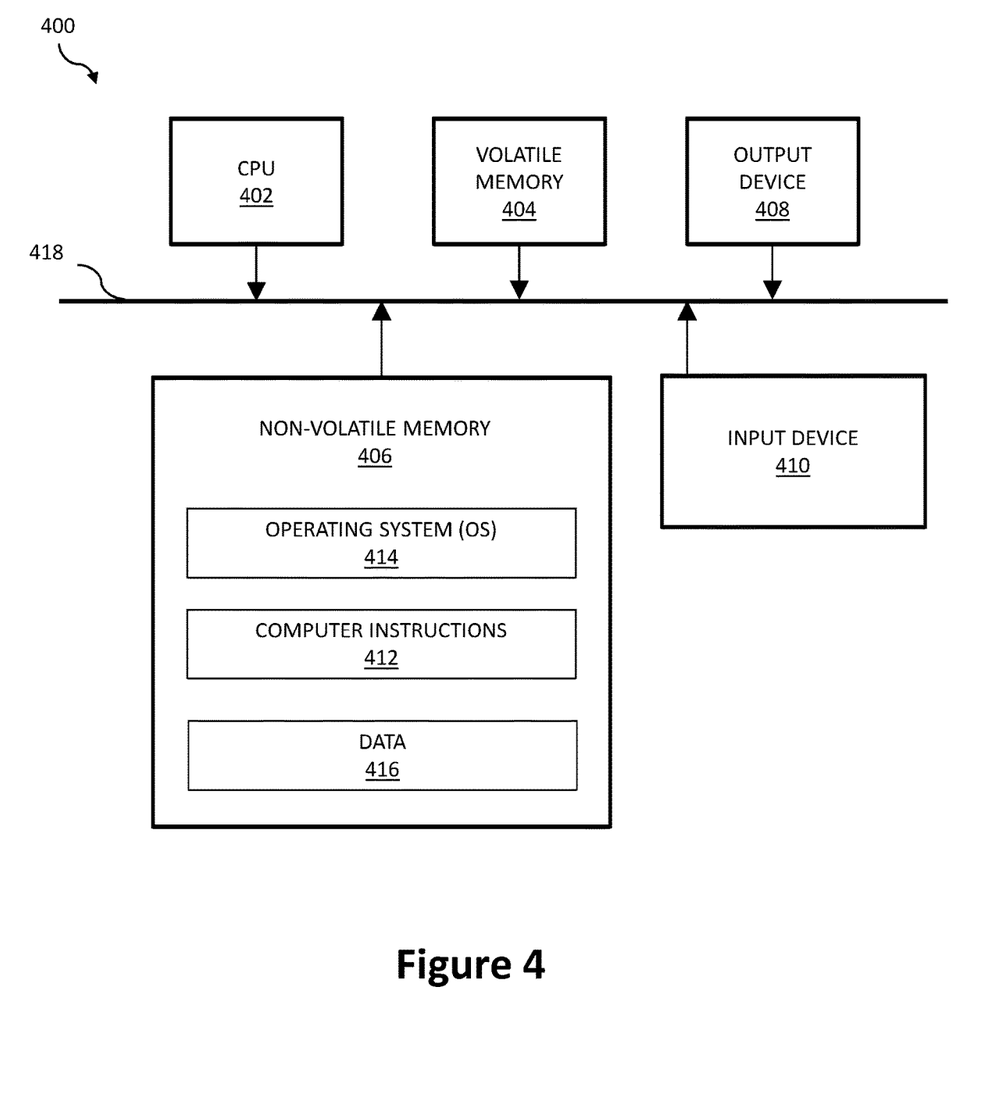
FIG. 4 is a block diagram showing components of a validation computer that may be used by a validation system, according to some embodiments of the present disclosure.

FIG. 4 shows illustrative computer 400 that can perform at least part of the processing described herein, according to an embodiment of the disclosure. Computer 400 may include processor 402, volatile memory 404, non-volatile memory 406 (e.g., hard disk), output device 408 (e.g., a display), and input device 410 (e.g., a mouse, a keyboard), each of which is coupled together by bus 418. Non-volatile memory 406 may be configured to store computer instructions 412, operating system 414, and data 416. In one example, computer instructions 412 are executed by processor 402 out of volatile memory 404. In some embodiments, computer 400 corresponds to a virtual machine. In other embodiments, computer 400 corresponds to a physical computer.

Referring again to FIG. 4, processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

As detailed above, the validation framework may return a list of validation errors at once, thereby saving time and network bandwidth. The framework may also enable dynamic injection of custom validations with minimal effort for objects and object graphs. The framework may express the validations though a configurable, readable data serialization standard that can be loaded from external storage systems. The framework may further allow for customized error codes and error descriptions for input payloads.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Additionally, the software included as part of the concepts, structures, and techniques sought to be protected herein may be embodied in a computer program product that includes a computer-readable storage medium. For example, such a computer-readable storage medium can include a computer-readable memory device, such as a hard drive device, a CD-ROM, a DVD-ROM, or a computer diskette, having computer-readable program code segments stored thereon. In contrast, a computer-readable transmission medium can include a communications link, either optical, wired, or wireless, having program code segments carried thereon as digital or analog signals. A non-transitory machine-readable medium may include but is not limited to a hard drive, compact disc, flash memory, non-volatile memory, volatile memory, magnetic diskette, and so forth but does not include a transitory signal per se.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

What is claimed is:

1. A method of validating an input using a computer-based validation framework, the method comprising
receiving, by the validation framework, an input from at least one of an online form or a web application, wherein the input is either user-supplied or system-supplied;
generating, by the validation framework, one or more properties from the input;
constructing, by the validation framework, a key using at least one of the one or more properties;
choosing, via using the key by the validation framework, a validation type from a configuration file that has been pre-loaded into volatile memory from a source external to the validation framework;
executing a validator, based on the validation type, on the input to find one or more errors for the at least one property;
filtering the one or more errors to create a list of errors, according to a user-defined filter; and
returning the list of errors comprising the one or more errors.

2. The method of claim 1, wherein the list of errors comprises each of the errors found for each of the properties from the input.

3. The method of claim 1, wherein the validation type comprises a validator name, an error code, and an error message.

4. The method of claim 3, wherein the executed validator comprises the validator name.

5. The method of claim 1, wherein the input comprises a plurality of properties.

6. The method of claim 1, wherein the configuration file comprises a YML file.

7. A computer-readable medium comprising instructions stored thereon which when executed by a machine cause the machine to:
load a validation configuration file from an external storage system by a configuration loader module of a validation framework;
receive a first input object from a first external input source comprising at least one of an online form or a web application, wherein the first input object is either user-supplied or system-supplied, wherein the first input object comprises a first set of property metadata;
construct a first searchable key based on the first set of property metadata;
retrieve a first validator name associated with the first searchable key from the validation configuration file;
retrieve a first validator associated with the first validator name, wherein the first validator initiates a first validation process on the first input object;
in response to a first validation result comprising no error code, receive a second input object from a second external input source, wherein the second input object comprises a second set of property metadata;
construct a second searchable key based on the second set of property metadata;
retrieve a second validator name associated with the second searchable key from the validation configuration file;
retrieve a second validator associated with the second validator name, wherein the second validator initiates a second validation process on the second input object;
output the first validation result from the first validation process and a second validation result from the second validation process;
filter one or more errors to create an error list, according to a user-defined filter; and
output the error list.

8. The computer-readable medium of claim 7, wherein the validation configuration file comprises at least one of a validator name, an error code, and an error message.

9. The computer-readable medium of claim 7, wherein the property metadata comprises at least one of type, name, parent type, and property value.

10. The computer-readable medium of claim 7, wherein at least one of the first external input source and the second external input source comprises a user input.

11. The computer-readable medium of claim 7, wherein at least one of the first external input source and the second external input source comprises an API.

12. The computer-readable medium of claim 7, wherein the error list comprises an error code and an error message associated with the error code.

13. The computer-readable medium of claim 7, wherein the configuration file comprises a YML, file.

14. A system of validating an input object, comprising:
a memory configured to store program instructions;
an external storage system configured to store a validation configuration file; and
a processor communicatively coupled to the memory and to the external storage system, wherein the processor configured to execute program instructions that cause the processor to:
load the validation configuration file from the external storage system by a configuration loader module of a validation framework;
receive the input object from an external input source by a domain module of the validation framework, the external input source comprising at least one of an online form or a web application, wherein the input object is either user-supplied or system-supplied;
collect property metadata of the input object by an executor module of the validation framework;
construct a searchable key based on the property metadata;
retrieve a validation map associated with the searchable key from the validation configuration file;
retrieve a validator associated with the validation map, wherein the validator initiates a validation process on the input object;
filter one or more errors to create an error list, according to a user-defined filter; and
output the error list.

15. The system of claim 14, wherein the property metadata comprises at least one of type, name, parent type, and property value.

16. The system of claim 14, wherein the external input source comprises a user input.

17. The system of claim 14, wherein the external input source comprises an API.

18. The system of claim 14, wherein the error list comprises an error code and an error message associated with the error code.

19. The system of claim 14, wherein the configuration file comprises a YML file.

\* \* \* \* \*